March 17, 1953  G. W. YARBER  2,631,696

BRAKE CONTROL MECHANISM

Filed May 2, 1949  3 Sheets-Sheet 1

GORDON W. YARBER
INVENTOR.
REYNOLDS & BEACH
ATTORNEYS

Robert W. Beach

BY

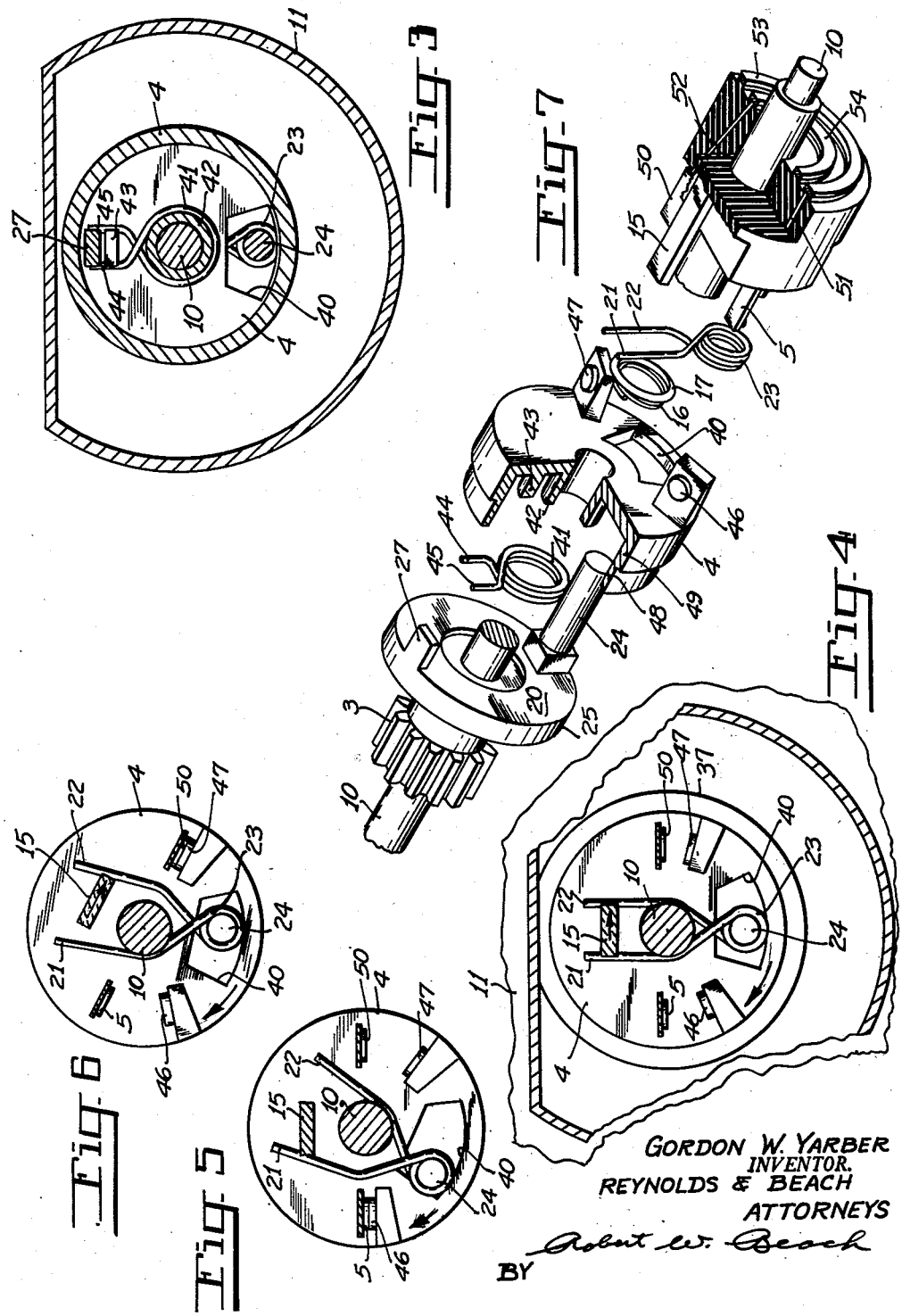

GORDON W. YARBER
INVENTOR.
REYNOLDS & BEACH
ATTORNEYS

Patented Mar. 17, 1953

2,631,696

UNITED STATES PATENT OFFICE 2,631,696

BRAKE CONTROL MECHANISM

Gordon W. Yarber, near Seattle, Wash., assignor to Boeing Airplane Company, Seattle, Wash., a corporation of Delaware Application May 2, 1949, Serial No. 90,965

13 Claims. (Cl. 188—181)

This invention relates to automatic brake control mechanism for vehicles, its purpose being to prevent the wheels of the vehicle from skidding along the ground.

It is frequently desired to bring a vehicle to a stop as rapidly as possible, and it has been found that a greater decelerating force can be exerted on the vehicle when its wheels are allowed to turn slowly instead of locked against turning and skidding along the ground. Moreover, such skidding produces excessive wear on the vehicle tires. A particular instance in which the most rapid deceleration action is frequently desired is in the case of an airplane stopping after landing with as short a ground run as possible.

A principal object of this invention is to provide brake control mechanism which will operate automatically in a manner to cause the brake to exert the greatest retarding force which can be applied to a wheel without causing it to skid along the ground. Whenever manual brake control mechanism is moved to brake-operating position, such automatic control mechanism will become operative in this manner without attention on the part of the vehicle operator.

More specically it is an object to make such mechanism especially suitable for use on airplanes by being of compact construction and light while capable of effecting control over a powerful brake, and which can be mounted either on the wheel supporting structure or at a location remote from the wheel with equal utility.

It is a further object to provide such brake control mechanism which will operate reliably, although provided with adequate safeguards, thereby to effect a positive action on the brake system, rather than an action of variable effectiveness which might be influenced by vibration of the mechanism or jerks of the vehicle to produce a sporadic and relatively ineffective operation.

In essence the invention embodies an inertia element, such as a flywheel, which is set into motion by rotation of a vehicle wheel, the braking of which is to be controlled, and which, upon excessive retardation of the associated wheel, will operate mechanism to release the brake wholly or in part. Upon such relief of braking force the wheel will be accelerated by ground contact to terminate the skid, and when the wheel has regained sufficient speed the brake automatically is reapplied, but ordinarily the brake will not be reapplied until the desired wheel speed has been resumed. Safety mechanism is provided, however, so that should normal automatic reapplication of the brake be delayed longer than for a predetermined time period, such as would be occasioned by failure of the control mechanism for any reason, the brake will nevertheless be reapplied.

In the construction of my brake mechanism the various parts are yieldably interconnected to prevent excessive rapid acceleration of one part by another.

The preferred construction of my brake control mechanism illustrated in the accompanying drawings has various additional advantages which will be discussed in the following detailed description of its construction and operation.

Figure 1 is a longitudinal sectional view through my brake control mechanism.

Figure 2 is a transverse sectional view through a portion of the brake control mechanism taken on line 2—2 of Figure 1; Figure 3 is a transverse sectional view through such mechanism along line 3—3 of Figure 1; Figure 4 is a transverse section on line 4—4 of Figure 1, showing parts in neutral relationship, while Figure 5 is a similar view with parts in brake-releasing relationship, and Figure 6 is a similar view with the parts in brake-applying relationship.

Figure 7 is an exploded top perspective view of internal structure of the brake control mechanism, showing parts broken away.

Figure 1:
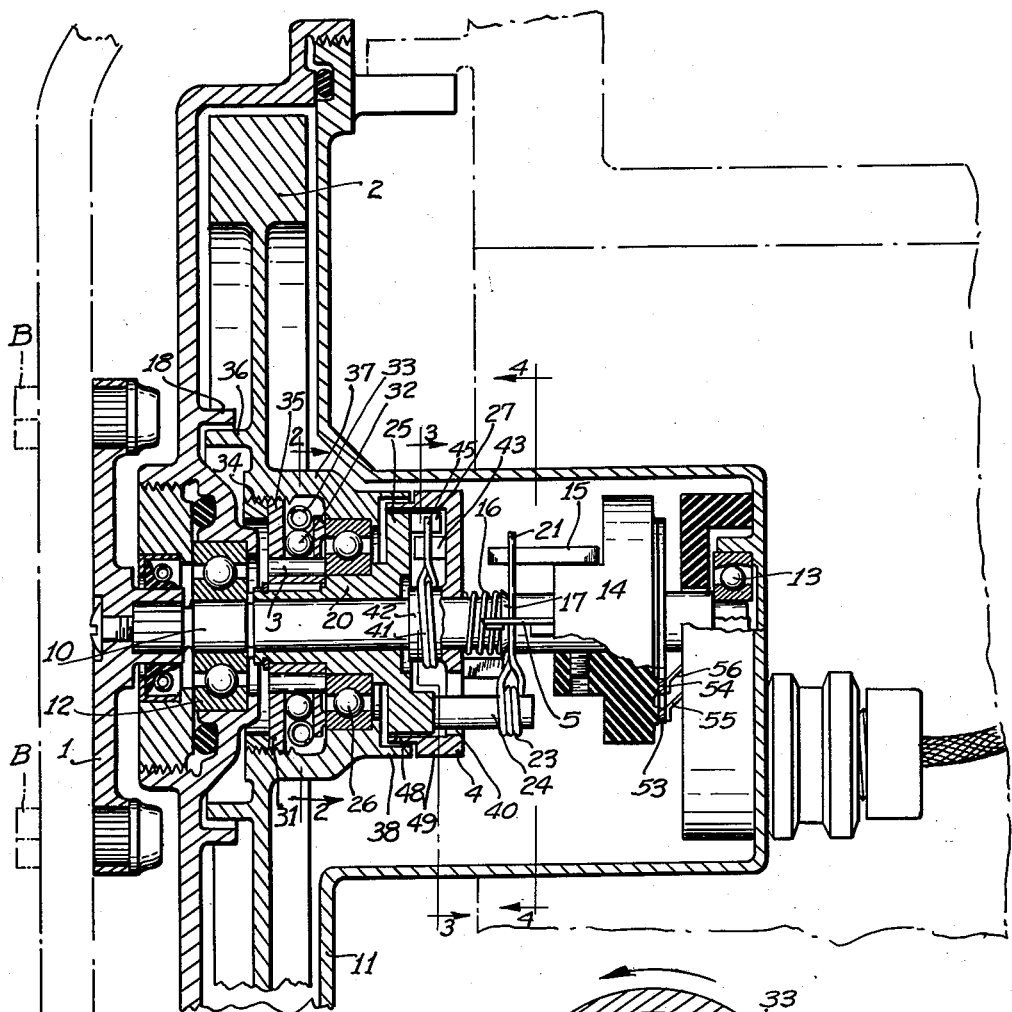

My brake control mechanism incorporates a skid-sensing unit shown in Figure 1 including a wheel-connected element which may take the form of a disk 1 carried by a shaft 10. This disk may be connected directly to a wheel W by bolts B, in which case the sensing unit will, of course, be located adjacent to the wheel, or the sensing unit may be placed remote from the wheel and connected to it by any suitable motion-transmitting connecting mechanism. It is not at all essential for the sensing unit to close to the wheel in order to function in the intended manner.

The shaft 10, which will be rotated by disk 1 in synchronism with the wheel, is conveniently mounted in a casing 11 on antifriction bearings 12 and 13, carrying opposite ends of the shaft. Secured upon this shaft, such as by a set screw as shown in Figure 1, is a circular member 14 which is operatively connected to the inertia device.

To promote compactness of the skid-sensing unit it is desirable for the inertia member, in the form of flywheel 2 and its drive mechanism connecting it to shaft 10, to be arranged concentrically with such shaft. This mechanism is shown as composed of a sleeve 20 fitted loosely on such shaft and connected resiliently to it through the circular member 14 by the prong ends 21 and 22 of the spring 23, shown best in Figures 1 and 4. The coil of this spring is wound tightly about a pin 24 projecting from one face of flange 25 on sleeve 20 generally parallel to shaft 10 toward the circular member 14, and the prongs formed by the ends of such spring straddle and embrace and bridge between the shaft 10 and a bar 15 projecting transversely from member 14 parallel to such shaft and at the side of it opposite rod 24. The yieldable connection afforded by such spring enables the circular member 14 and sleeve 20 to be turned somewhat relative to each other by a torque applied to one of them, as illustrated in Figures 5 and 6, in which event the bar 15 and rod 24 will depart from registry with a diametral plane of shaft 10. By such movement, however, the prongs 21 and 22 of spring 23 will be spread apart circumferentially to stress the spring torsionally, and thus stressed it will produce a force on one or the other corresponding sides of bar 15 and rod 24, tending to restore them to registry with a diametral plane of shaft 10 irrespective of the direction of relative turning between member 14 and sleeve 20. The spring 23 may be held in position axially of shaft 10 by a compression spring 16 backing a conical washer 17 engaging the spring prongs and pressing them against a shoulder on the shaft.

The flywheel 2 is journaled on sleeve 20 by an antifriction bearing 26. A two-way drive mechanism is interposed between such sleeve and flywheel of special overrunning clutch character. Actually the drive is not positive in either direction, but it is preferred that as sleeve 20 is turned by the shaft 10 through the resilient connection afforded by spring 23, it will transmit a greater driving force tending to turn flywheel 2 than such flywheel can produce on sleeve 20 as the flywheel overruns the sleeve. This will enable the flywheel to be accelerated rapidly as the wheel begins to turn, whereas the flywheel will be decelerated to a minimum by application of the desired control torque to sleeve 20 as the flywheel overruns the shaft 10.

Figure 2:
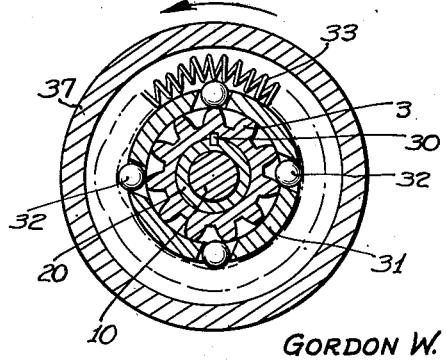

A suitable type of overrunning drive mechanism interposed between sleeve 20 and flywheel 2, shown in Figures 1 and 2, is composed of a gear 3 secured by a key 30 to the sleeve 20, which gear fits closely within a collar 31 apertured radially to receive one or more balls 32. Such balls are of a diameter greater than the thickness of the collar, so that if one side of a ball is even with one surface of the collar its opposite side will project beyond the opposite collar surface. Thus, when disposed opposite a tooth of gear 3, as are the upper and left balls in Figure 2, a ball will be pressed outwardly so that it projects beyond the outer surface of the collar.

It will be evident that if the balls 32 were movable freely through the ball-retaining apertures in collar 31, each ball would be reciprocated outward as a tooth passed it if the ball projected inwardly beyond the inner surface of such collar. On the other hand, if the ball were held rigidly in an inwardly projecting position, the teeth of gear 3, fitting closely within collar 31, would engage the side of such projecting ball portion, as a tooth is engaging the ball at the right of Figure 2.

In order to transmit a driving force from the sleeve 20 carried by shaft 10 to collar 31, therefore, it is only necessary to provide mechanism for holding a ball 32 in its inner position where the side of a tooth of gear 3 will abut the ball. Since it is desired that the drive mechanism be not positive, however, resilient means, such as a spring 33, are provided for holding the balls yieldably in their inner positions. This spring encircles the ball-retaining collar 31 circumferentially as shown in Figures 1 and 2, to bear against the outer sides of the balls. Aside from considerations of load transmission it would not be necessary to have more than one ball 32 if the several balls were spaced apart circumferentially at intervals corresponding to a full multiple of the pitch of gear 3. As is evident from Figure 2, however, the spacing of the balls, while equal, is not a multiple of the gear tooth spacing. On the contrary, gear 3 is shown as having eleven teeth so that a tooth will move into a ball-engaging position like that shown at the right of Figure 2 with one or another of the balls for each $1/44$ of a revolution of gear 3 relative to collar 31, which is approximately every eight degrees.

Each time a tooth of gear 3 thus laterally abuts one of the balls 32, an incremental force will be transmitted from the gear to the collar 31, tending to accelerate rotation of the collar into synchronism with the gear. Because of the high frequency of such applications of force the driving effort transmitted will be virtually continuous, but such frequency may be increased or decreased, of course, by varying the number of balls, the number of teeth on gear 3, and the relationship between the number of such balls and gear teeth. Since, as previously stated, the gear is secured to sleeve 20 and the collar 31 is secured to the flywheel 2, such as by the engagement of threads 34 on the flywheel hub and on the periphery of a flange 35 on collar 31 directed radially outward, the shaft 10 will exert a rotative driving force on flywheel 2. It will be understood, however, that, because balls 32 are pressed inward only resiliently, when the wedging pressure exerted by a tooth of gear 3 exceeds a force with which a ball is pressed inward by hoop tension of spring 33, such ball will be wedged outward into the position shown at the top of Figure 2, deflecting the spring, so that the gear tooth may pass across the inner side of the ball.

Alternatively, if the gear should be held against rotation so that the flywheel driving collar 31 to which it is secured is rotated faster than the gear, the balls 32 would be forced against the sides of the teeth on gear 3 successively, preliminary to being forced outward by such teeth, so that the flywheel would tend to accelerate the rotation of sleeve 20. Such drive tendency may be utilized to effect a brake-releasing control action. Since the torque applied to the skid-sensing mechanism by the rotation of gear 3 need only be great enough to secure the requisite deflection of spring 23, it is desirable for the rotative force transmitted by collar 31 to gear 3, to obtain rapid initial and recovery acceleration of flywheel 2, to be substantially greater than the force which can be transmitted by such gear to collar 31 during overrunning of the flywheel.

This result can be accomplished by slightly inclining the axes of the ball-receiving holes in collar 31 relative to a radius of such collar passing through each respective hole. Assuming that the gear collar and flywheel assembly will all be rotated in the direction indicated by the arrow in Figure 2, the inner end of the axis for each hole will lead in the rotative direction, and the outer end of each axis will lag in the rotative direction. A force exerted by a tooth of gear 3 on a ball 32 instead of pressing the ball directly against the spring 33, therefore, will convert a substantial portion of the tooth pressure against the ball directly into pressure against the inclined side of the ball-receiving orifice opposite the tooth, which will act to rotate the collar 31 and flywheel in the direction indicated by the arrow in Figure 2.

On the other hand, if the flywheel is turning in the direction of the arrow in Figure 2 and the force on gear 3 transmitted to it through spring 23 from shaft 10 is such that the gear tends to lag behind the flywheel, the spring 33 will urge a ball 32 against the rotatively rearward face of a tooth, in the relationship shown at the bottom of Figure 2. Such pressure will tend to turn the gear 3, but, because this force will be exerted directly in line with the axis of the ball-receiving hole, such ball will tend to yield against the pressure of spring 33 on it and move out of circumferentially abutting engagement with the gear tooth much more readily than in the case where the gear 3 is rotating at a speed higher than collar 31 and transmitting force to the collar through the balls.

If the overrunning drive mechanism is to transmit from the gear 3 to the collar 31, as the speed of the gear tends to exceed that of the collar, a driving force greater than the force to be exerted by the collar 31 on the gear 3 as the flywheel 2 and the collar tend to overrun the vehicle wheel, it will be necessary for the axis of each ball-receiving hole to be inclined from precisely radial disposition in the manner described. If there are right and left wheels on the vehicle, the inclination of these apertures must correspond even though the units for sensing the brake operation are mounted in opposite relationship to the two wheels. Consequently, with respect to the parts of the sensing mechanism itself, the inclination of the ball-receiving apertures for opposite wheels must be opposite.

For that reason the flywheel 2 and the casing 11 may have interfitting flanges 36 and 18, respectively, which are different on the left and right units to prevent a flywheel of a right unit from being assembled with a casing of a left unit. Such structural features will insure that the axes of the ball-receiving holes are always inclined in the proper sense with respect to the direction of travel of the vehicle.

It will now be evident that the wheel sleeve 20, rotated through the spring 23 generally in synchronism with the shaft 10, will drive the flywheel 2 through the overrunning drive mechanism including the gear 3, balls 32 and collar 31. Until the brake is applied to the wheel, therefore, the shaft 10, sleeve 20, gear 3, collar 31 and flywheel 2 will all be rotating in synchronism. When a retarding force is applied to the wheel by the brake, however, shaft 10 will be decelerated, as will circular member 14, and to the same extent sleeve 20 will tend to be decelerated through the interconnection with such member of spring 23, engaging bar 15 and rod 24.

As soon as sleeve 20 begins to be decelerated a force will be produced by flywheel 2 tending to continue the higher speed rotation of such sleeve, which will effect relative angular movement between circular member 14 and sleeve 20 in the sense that such sleeve tends to turn the member by the continued rotation of the flywheel 2. While the connection of member 14 and sleeve 20 by spring 23 is double-acting, so that the sleeve will tend to drive shaft 10, it can have no direct effect on the shaft because of the much greater direct effect on it of the wheel connected positively to it. Consequently, mechanism, operated by such sensing coaction of the parts effected by too severe application of the brake and actuated by sleeve 20, is provided to effect release of the brake sufficiently to induce shaft 10 to be speeded up to the point where skidding action will be avoided.

The control mechanism actuated by such sensing mechanism described above comprises a disk 4 mounted loosely on shaft 10 between the flange 25 of sleeve 20 and circular member 14. Through an aperture 40 in the disk the pin of sleeve 20 projects in order to carry spring 23 for engagement with the bar 15 of the circular member 14, so that such pin does not effect any driving action on disk 4.

Normally disk 4 is driven in synchronism with sleeve 20 on shaft 10 by a spring 41 shown in Figures 1 and 3 encircling a hub 42 on the side of such disk, and embracing and bridging between two lugs 43 of disk 4 and 27 on the flange 25 of sleeve 20. These lugs project oppositely from the adjacent faces of sleeve flange 25 and disk 4 into radially overlapping or registering relationship when spring 41 is relaxed. These lugs are disposed close alongside each other as shown in Figures 1 and 3, and, as the sleeve 20 and disk 4 turn slightly relative to each other, the prongs 44 and 45 formed by the ends of spring 41 will be moved apart in whichever sense the relative turning between the sleeve and disk occurs. Spring 16 holds disk 4 in position to maintain lug 43 overlapping lug 27. While spring 41 enables some relative turning movement between disk 4 and sleeve 20 as torque is applied between them, pin 24 limits their possible relative movement by its engagement with the ends of slot 40.

Disk 4, driven by sleeve 20, will be turned steadily with shaft 10 as long as no driving or restraining force is exerted on such sleeve by the flywheel 2 sufficient to deflect a prong 21 or 22 of spring 23 appreciably. Skid-sensing disk 4, however, carries control mechanism for automatically effecting control over the wheel brake when the skid-induced forces on shaft 10 and sleeve 20 are such as to produce a substantial relative angular displacement of these members. The control mechanism shown best in Figures 4 to 7, inclusive, incorporates electrical contact members 46 and 47 projecting generally axially from the face of disk 4 adjacent to circular member 14. To cooperate with these contact members respectively, the circular member 14 carries complemental contact fingers 5 and 50 projecting axially toward disk 4 into positions overlapping the contacts 46 and 47. These contacts are connected in a brake control circuit by wires 51 and 52 which lead to slip rings 53 and 54, respectively, contacted by brushes 55 and 56. When the contacts of either pair are pressed together spring 41 will yield to provide a sustained contact as long as sufficient pressure is applied, thus avoiding a bouncing contact which might otherwise occur on striking engagement of the contacts.

When the flywheel 2 has been accelerated to a reasonable speed by rotation of shaft 10 through the action of the slipping coupling 3, 31, the contacts 46 and 47 will be spaced from their complemental contacts 5 and 50 approximately the distances shown in Figure 4. If the brake should then be applied hard to the wheel connected to shaft 10, this shaft would be decelerated suddenly, and perhaps even stop momentarily corresponding to a skid condition of the wheel. Such action would tend to stop sleeve 20 in turn, but the inertia of rotating flywheel 2, acting through the slipping coupling 3, 31 would immediately exert considerable torque on such sleeve tending to continue its rotation. Such torque would cause deflection of spring prong 21, and disk 4 would be turned with sleeve 20 to the point shown in Figure 5 where contact 46 will engage contact 5 to close an electric circuit from ground through the control circuit connection 51. Despite the violence of movement of the parts thus effected, spring 41 will produce sufficient cushioning action between sleeve 20 and disk 4 to effect a smooth, firm engagement between these contacts to insure reliable completion of a circuit through them to the control mechanism of adequate duration.

The effect of completing a circuit to the control mechanism through closing of contacts 46 and 5 will be to relieve the braking force to a predetermined extent, enabling the ground contact of the wheel again to accelerate it rapidly to avoid a skid, and in turn to rotate shaft 10 quickly. Circular member 14 carried by it is thus moved in the clockwise direction, as viewed from the right of Figure 1, from a position such as that shown in Figure 5 to that of Figure 6, turning contact 50 into engagement with contact 47, which immediately deenergizes the relieving mechanism. Again, despite the violence with which the parts may move during this recovery action, the spring 41 will enable disk 4 to yield relative to sleeve 20 to produce a firm engagement of the contacts sufficiently sustained to insure an effective electrical connection between them.

While any degree of relative displacement between shaft 10 and disk 4 could be arranged to effect energization or deenergization of the brake control mechanism, it is preferred that somewhat greater displacement between these members be required from the neutral position of Figure 4 in order to effect brake-releasing operation than is necessary in the opposite direction from neutral to effect reapplication of the brake. Consequently in such neutral position of the parts established by alignment of bar 15 and rod 24 in a diametral plane of shaft 10 as shown in Figure 4, the contact 46 will be spaced somewhat farther from the contact 5 than the spacing between contacts 47 and 50. This relationship is established by locating contacts 46 and 47 in the proper position on disk 4, depending upon the direction in which the shaft 10 is to turn.

If brake-applying recovery operation of the mechanism should not occur for a predetermined time interval, the brake again would be reapplied automatically as a safety precaution even though a circuit had not been closed through contacts 47 and 50, unless contacts 46 and 5 were still closed. Normally, however, the mechanism hunts between brake-released and brake-applied conditions.

Not only must the flywheel and its collar 31 be designed for either a left or right unit of the vehicle, therefore, but disk 4 likewise must be so designed. Consequently, to prevent inadvertent assembly of improper elements, the hub 37 of flywheel 2 is provided with a flange 38 extending oppositely from the flange 36 on the flywheel itself. Within this flange fits a lip 48 on a circumferential flange 49 of the disk 4. The unit for the other wheel would have interfitting members differently arranged.

Figure 8:
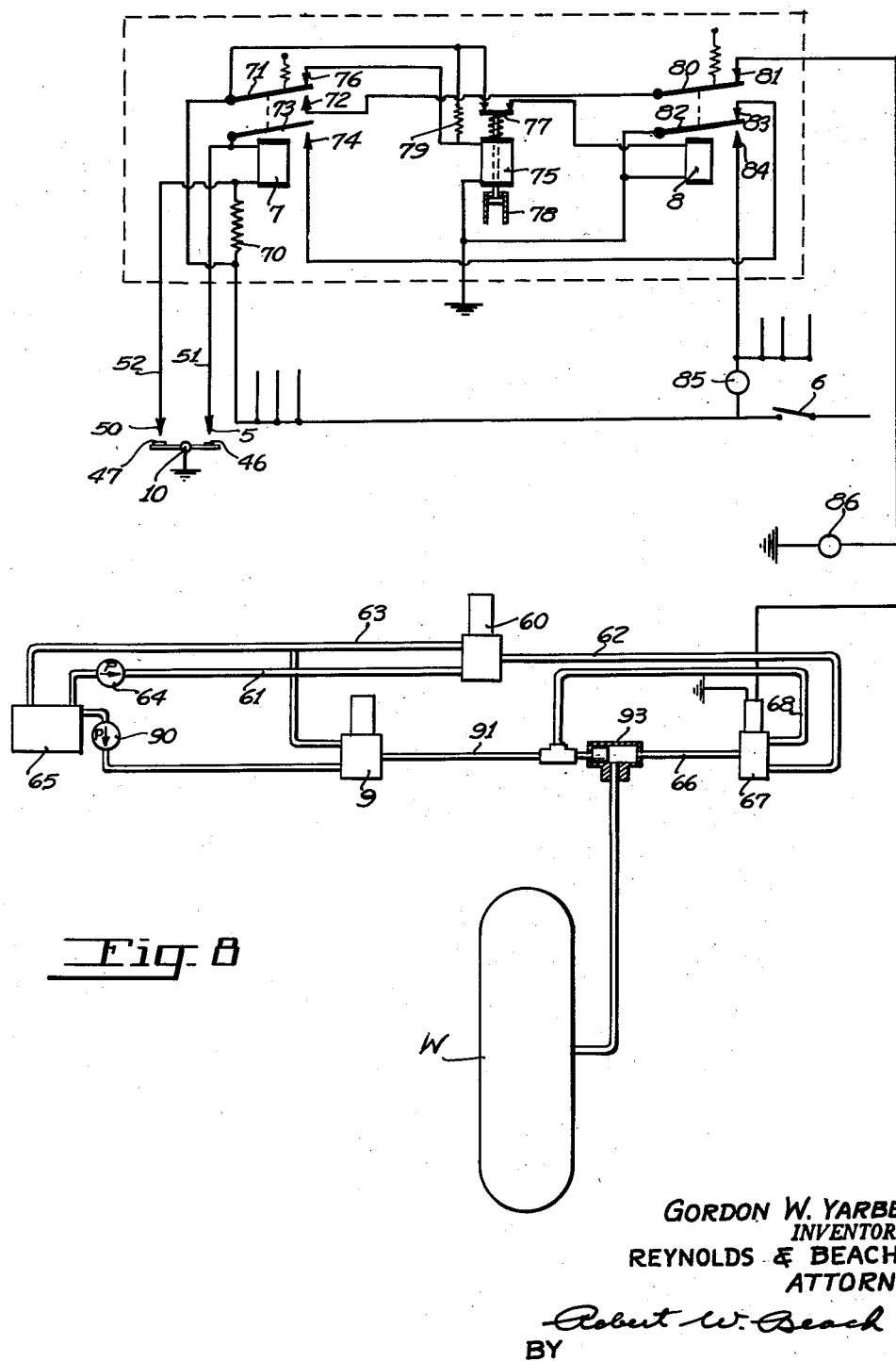
Figure 8 is a diagrammatic view of a brake control system incorporating both electric and hydraulic circuits, in which my automatic brake control device may be incorporated.

Keeping in mind the operation of the skid-sensing mechanism discussed above, requiring that the brake release mechanism be energized on closure of contacts 5 and 46 and deenergized on closure of contacts 50 and 47, the electric and hydraulic control circuits shown in Figure 8 may now be examined. While in that figure the shaft 10 is shown as being located remote from the wheel W, it will be understood, as mentioned previously, that this shaft may be mounted on the wheel-carrying structure or at a remote location, as desired, it merely being necessary to provide a drive connection between such shaft and the wheel.

To render the automatic brake control mechanism effective the vehicle operator will close the switch 6. The brake is applied normally by actuation of metering valve 60 to vary the connection between the main pressure conduit 61 of the hydraulic system and the intermediate conduit 62, and correspondingly the disconnection between such intermediate conduit and the return conduit 63. Fluid under pressure may be supplied to the conduit 61 by a pump 64 from a reservoir 65, into which the return conduit 63 empties.

Intermediate conduit 62 normally communicates with the wheel brake line 66 through a solenoid valve 67 controlled by mechanism operating in response to the skid-sensing mechanism described above. When the solenoid of valve 67 is energized, the intermediate pressure supply conduit 62 is closed and the brake conduit 66 is placed in communication with a by-pass conduit 68 connected to the return line 63. Energization of the valve 67, therefore, will relieve the brake-applying pressure wholly or in part, depending upon the setting of the valve to shut off the supply of brake-applying fluid either wholly or in part.

The energizing circuit for the solenoid of valve 67 is in series with switch 6, so that when this brake-applying switch is open, the brake-relieving control circuit will be deenergized. Moreover, the brake-relieving circuit will remain wholly deenergized until sufficient relative angular movement of disk 4 and shaft 10 occurs to close contacts 5 and 46. Closing of these contacts will energize master relay 7 by current flowing from the switch 6 through resistance 70 to the relay coil and through the return to ground established by contact of switch points 5 and 46.

Immediately upon energization of relay 7 its armature 71 will be moved into engagement with contact 72, closing a circuit through the coil of solenoid valve 67 to release the pressure in the brake conduit 66. Simultaneously armature 73 will engage the contact 74 to set up a relay-holding circuit, including switch arm 82 and contact 83 of relay 8, in parallel with circuit 51, which will maintain relay 7 energized even though contacts 5 and 46 should separate.

The period for which master relay 7 will remain energized is determined by the rapidity of skid-recovery acceleration of shaft 10 to close contacts 47 and 50, the maximum period being limited by the normally-closed safety relay 75 of the delayed closing type. Upon closing of switch 6 current will flow through armature 71 and its contact 76, engaged when relay 7 is deenergized, to energize relay 75 instantaneously. Of course, as soon as relay 7 is energized, engagement of armature or switch arm 71 with contact 76 will be broken, but the flow of electrical current through it to relay 75 will be maintained to hold its normally closed armature in circuit-breaking position continuously as long as the main control switch 6 is closed and relay 7 is deenergized.

Relay 75 controls the energizing circuit to an interrupting relay 8 by way of its armature or switch arm 77. The safety timing period of the solenoid valve 67 to terminate brake-relieving operation wherever contacts 47 and 50 should fail to be reclosed by skid-recovery movement of shaft 10, or relay 7 should fail to be deenergized for any other reason, will be initiated by deenergization of relay 75 upon disengagement of switch arm 71 from contact 76 by energization of relay 7. The duration of such safety timing period is established in one or both of two ways. Relay 75 is a slow-release relay, incorporating, for example, a dashpot 78, so that there will be an appreciable delay in reclosing of the circuit through armature 77 after relay 75 has been deenergized. The retarding action of the dashpot, the character of this dashpot, and the length of stroke of the relay plunger will determine the maximum safe period of delay during which the solenoid of valve 67 remains energized.

Additionally, or alternatively, a resistance 79 connecting the power side of the relay to the current source in parallel with switch arm 71 and contact 76 may be employed to continue the passage of a small current through the coil of relay 75, thus creating a magnetic field retarding the outward movement of the relay plunger, while being of insufficient strength to prevent such outward movement.

When the switch arm 77 has reclosed, current will be supplied immediately to relay 8, energizing it to move its armature 80 out of engagement with contact 81, which contact and armature are in series with the armature 71 and contact 72 of master relay 7 and the solenoid of valve 67. Such energization of relay 8 will therefore effect deenergization of the solenoid valve 67, which will shift into position again to apply a braking force to the wheel W.

In addition, energization of relay 8 in the manner described will shift its armature 82 from engagement with contact 83 in the holding circuit for master relay 7 and in turn will move it into engagement with contact 84 to energize a signal light 85 indicating that the brake is in applied condition effected by the emergency timing mechanism.

When, during the safety timing period between energization of relay 75 and reclosing of the circuit to relay 8 by armature 77, the wheel W accelerates sufficiently rapidly to complete a circuit through contacts 47 and 50, as explained above, immediately the power supply to master relay 7 would be grounded, the relay-holding circuit through armature 73 merely being to ground and not another power circuit, so that such relay would be deenergized instantaneously. Such action would not result in a short of the power supply to ground, however, because of the interposition in the circuit of the comparatively high resistance 70. If relay 7 is thus deenergized, its armature 71 would return into engagement with contact 76, thus breaking the circuit through contact 72 to the solenoid of valve 67. At the same time, of course, armature 73 would break its contact with terminal 74 in the relay-holding circuit, so that relay 7 would not be reenergized through such circuit despite the instantaneous nature of the contact between terminals 47 and 50, until contacts 5 and 46 have again been closed.

While the brake-control mechanism described above will, as explained, release the braking force acting on the wheel to prevent it skidding, it should also be understood that the principal reason for this operation is that the most effective braking action can be obtained with a wheel which is rolling rather than skidding. However, it is not desired to discontinue or relieve the braking force for any considerable period of time because unless the brakes are reapplied quickly upon recovery of wheel speed the stopping effect on the vehicle would then be reduced below that obtained even when the wheel is skidding. The dwell effected by relay 75 in deenergization of the solenoid of valve 67 after closing of contacts 5 and 46 is very short, and will range from a fraction of a second to a very few seconds at the most, depending on the type of installation of the system. A fine adjustment of the timing can be obtained by substituting resistances of different value at 79 without changing the characteristics of the dashpot 78.

Of course, if the wheel again approaches a skid, the mechanism will sense such condition and contacts 5 and 46 will be closed once more to reenergize relay 7. In the normal braking of a landing airplane, therefore, it would be expected that the valve 67 would be energized and deenergized intermittently, probably many times. Each time this valve is energized by energization of relay 7, the signal light 86 would flash, indicating brake-releasing operation. Light 85 would glow, however, advising the pilot of an unusual condition only upon energization of relay 8 by closing of switch 77, indicating brake-applying deenergization of valve 67 upon failure of relay 75 to be reenergized by deenergization of relay 7, and such light would continue to burn until relay 7 became deenergized.

If for some reason the control mechanism should fail to effect reapplication of the brake, the vehicle operator may operate the emergency brake metering valve 9 to apply the brake. This valve would supply hydraulic liquid under pressure from pump 90 to the conduit 91 forming part of the normal return duct, as illustrated in Figure 8. The pressure of this liquid would shift to the right the piston in the shuttle valve 93 to admit the hydraulic liquid to the brake line and cut off the normal supply duct 66.

It will be understood that a separate brake-sensing and control mechanism unit such as described will be provided for each wheel, as indicated by the several leads shown in Figure 8. The advantage of such mechanism for aircraft use is that the pilot may merely apply the brakes without regard to the possibility of skidding the wheels. At the same time, any desired degree of braking effect may be produced because the brake-control mechanism will not release the brake unless skidding is imminent. If desired the brake-actuating mechanism may be such that switch 6 will be closed automatically when the brake-operating mechanism approaches full-on position, rather than being closed manually by the operator before an anticipated braking operation, such as just prior to landing of an airplane using my mechanism. When my control mechanism is used in an airplane it can be stopped in the shortest possible run without risk of locking the wheels and causing excessive tire wear or failure. This operation is particularly desirable in large aircraft where it is difficult for the pilot to sense tire skidding, and even after skidding is recognized, the pilot's reaction to release the brakes takes much longer than the action of my automatic device.

I claim as my invention:

1. In brake control mechanism for controlling the braking of a vehicle wheel, including means operable to relieve the braking force on the wheel, the combination comprising a wheel-rotated member adapted to be rotated by such vehicle wheel, a flywheel, a rotative skid-sensing member, slipping coupling means interengaged between said wheel-rotated member, said flywheel and said rotative skid-sensing member, and operable to transmit a greater torque from said wheel-rotated member to said flywheel when said wheel-rotated member tends to overrun said flywheel than from said flywheel to said skid-sensing member when said flywheel tends to overrun said wheel-rotated member, and means actuated by said skid-sensing member when said flywheel tends to overrun said wheel-rotated member, for operating the brake-relieving means to relieve the braking force on the wheel.

2. The brake control mechanism defined in claim 1, in which the slipping coupling means includes a gear rotated by the wheel-rotated member, a ball-retaining collar encircling said gear and having cylindrical ball-receiving apertures extending therethrough, balls lodged in said apertures, and resilient means pressing said balls inwardly into the rotative path of the teeth of said gear, the axes of such apertures being inclined relative to the radii of said collar passing through the respective apertures to dispose the inner ends of such axes in leading relationship and the outer ends of said axes in trailing relationship relative to the direction of rotation of said collar to produce greater interference to relative rotation of such gear and collar during overrunning of the flywheel by the wheel-rotated member than when the reverse occurs.

3. Brake control mechanism for controlling the braking of a vehicle wheel, comprising a wheel-rotated member adapted to be rotated by such vehicle wheel, skid-sensing means moved in one direction relative to said wheel-rotated member automatically in response to excessive deceleration of said wheel-rotated member, brake-relieving means energized by such relative movement of said skid-sensing means and said wheel-rotated member and operable to relieve the braking force exerted on the wheel, recovery-sensing means moved oppositely relative to said wheel-rotated member automatically in response to acceleration of said wheel-rotated member following such brake-release, to deenergize said brake-relieving means for restoration of braking force on the wheel, and safety timing means operable to terminate energization of said brake-relieving means upon a lapse of a predetermined time interval following energization of said brake relieving means should said recovery-sensing means fail to deenergize the same earlier.

4. Brake control mechanism for controlling the braking of a vehicle wheel comprising a wheel-rotated member adapted to be rotated by said vehicle wheel, skid-sensing means moved in one direction relative to said wheel-rotated member automatically in response to excessive deceleration of such wheel-rotated member, brake-relieving means energized by such movement of said skid-sensing means and operable to relieve the braking force exerted on the wheel, and recovery-sensing means moved oppositely relative to said wheel-rotated member by acceleration of said wheel-rotated member and operable thereby to deenergize said brake-relieving means.

5. In brake control mechanism for controlling the braking of a vehicle wheel, including means operable to relieve the braking force on the wheel, the combination comprising a wheel-rotated member adapted to be rotated continuously by such vehicle wheel, a flywheel continuously rotatable relative to said wheel-rotated member in either direction relative thereto, a continuous slipping coupling having a first rotative element rotatively connected to said wheel-rotated member, having an opposed second rotative member rotatively connected to said flywheel and rotatable in continuous manner in either direction relative to said first rotative element, and having continuous rotational-slip means coacting with said two rotative elements and operable therebetween to transmit rotative force to said flywheel by rotation of said wheel-rotated member faster than said flywheel and further operable to exert rotational force on said first rotative element by rotation of said flywheel faster than said wheel-rotated member, the rotative connection between said wheel-rotated member and said first rotative element comprising resilient means yieldable to permit relative angular displacement between said wheel-rotated member and first rotative element during the exertion of rotational force on the latter by the flywheel, and brake relieving control means engageable by such displacement between said wheel-rotated member and first rotative element to operate said brake-relieving means thereby.

6. The combination defined in claim 5, wherein the rotational-slip means comprises cooperating force transmitting elements producing greater rotative force of acceleration on the flywheel when the first rotative element rotates faster than such flywheel by a given amount, than the force of deceleration produced on the flywheel thereby when the flywheel rotates faster than such first rotative element by the same given amount.

7. The combination defined in claim 5, wherein the slipping coupling comprises a toothed rotary element, a coacting rotary element having a recessed surface portion adjacent and facing the teeth of said toothed rotary element, a shiftable element received in the recess of said coacting rotary element, and resilient means carried by said coacting rotary element and urging said shiftable element continuously into yieldable interfering relation with the teeth of said toothed rotary element, whereby said resiliently urged shiftable element provides rotative coupling between said toothed rotary element and coacting rotary element, said rotary elements comprising the two rotative elements of the slipping coupling.

8. The combination defined in claim 7, wherein the shiftable element comprises a ball and the recess in the coacting rotary element is inclined in relation to the instantaneous direction of movement of the teeth engaged by the ball, the inclination being of a sense which causes the recess walls to guide the yieldable resiliently urged ball more readily from the path of the moving teeth when the flywheel rotates faster than the first rotative element than when such first rotative element rotates faster than the flywheel.

9. For use in brake control mechanism of the flywheel inertia sensitive type, the slipping coupling for driving connection to the flywheel, comprising a first rotative coupling element including a spur gear having teeth which are substantially symmetrical about their respective radial midplanes containing the axis of the gear, a second rotative coupling element including a ball-retaining collar encircling said spur gear and rotatable relative thereto, said collar having cylindrical ball-receiving bores extending generally radially in relation to said collar, the axes of said bores being somewhat canted, all in the same sense, relative to true radial lines through such respective bores, in a common diametral plane of the collar, balls lodged in said bores, and outwardly yieldable resilient means pressing said balls inwardly into resiliently yieldable interfering relation with the teeth of said gear for both directions of rotation thereof relative to the collar, whereby torque is transmitted between said coupling elements as a result of the interference between the gear teeth and balls during continuous relative rotation of said elements in either direction, the torque being greater in one direction than the other, of relative rotation of the coupling elements, as a result of the canting of the bores.

10. The slipping coupling defined in claim 9, wherein the bores extend through the collar and the resilient means comprises a helical spring closely encircling the collar and covering the outer ends of the bores, each ball being projected somewhat outward beyond the outer end of its bore during passage of a gear tooth across the inner end of such bore, permitted by outward yielding of the helical spring.

11. In brake control mechanism for controlling the braking of a vehicle wheel, including means operable to relieve the braking force on the wheel, the combination comprising a wheel-rotated member adapted to be rotated by such vehicle wheel, a flywheel, slipping coupling means interengaged between said wheel-rotated member and said flywheel, and operable to drive said flywheel by rotation of said slipping coupling means, a rotative skid-sensing member rotatably shiftable by said flywheel driving through said coupling means when said flywheel overruns said wheel-rotated member, resilient means interconnecting the slipping coupling means and the skid-sensing member, and means comprising switch contact elements interengageable by such shifting of said skid-sensing member for operating the brake-relieving means to relieve the braking force on the wheel.

12. In brake control mechanism for controlling the braking of a vehicle wheel, including means operable to relieve the braking force on the wheel, the combination comprising a wheel-rotated member adapted to be rotated by such vehicle wheel, a flywheel, slipping coupling means interengaged between said wheel-rotated member and said flywheel, and operable to drive said flywheel by rotation of said slipping coupling means, said slipping coupling means including a gear rotated by the wheel-rotated member, a ball-retaining collar encircling said gear and having a number of ball-receiving apertures extending therethrough fewer than the number of teeth on said gear and not a factor of the number of gear teeth, balls lodged in said apertures, and resilient means pressing said balls inwardly into the rotative path of the teeth of said gear, a rotative skid-sensing member rotatively shiftable by said flywheel driving through said slipping coupling means when said flywheel overruns said wheel-rotated member, and means engageable by said skid-sensing member thus shifted by said flywheel, for operating the brake-relieving means to relieve the braking force on the wheel.

13. In brake control mechanism for controlling the braking of a vehicle wheel, including means operable to relieve the braking force on the wheel, the combination comprising a wheel-rotated member adapted to be rotated by such vehicle wheel, a flywheel, slipping coupling means interengaged between said wheel-rotated member and said flywheel, and operable to drive said flywheel by rotation of said slipping coupling means, said slipping coupling means including a gear rotated by the wheel-rotated member, a ball-retaining collar encircling said gear and having ball-receivng apertures extending therethrough, balls lodged in said apertures, and an annular spring encircling said collar and pressing all of said balls inwardly into the rotative path of the teeth of said gear, a rotative skid-sensing member rotatively shiftable by said flywheel driving through said slipping coupling means when said flywheel overruns said wheel-rotated member, and means engageable by said skid-sensing member thus shifted by said flywheel, for operating the brake-relieving means to relieve the braking force on the wheel.

GORDON W. YARBER.

REFERENCES CITED

The following references are of record in the file of this patent:

UNITED STATES PATENTS

| Number | Name | Date |
|---|---|---|
| 651,706 | Forbes | June 12, 1900 |
| 1,560,844 | Olds | Nov. 10, 1925 |
| 2,098,785 | Mathewson | Nov. 9, 1937 |
| 2,140,620 | Farmer | Dec. 20, 1938 |
| 2,363,611 | Newell | Nov. 28, 1944 |
| 2,393,031 | Eksergian | Jan. 15, 1946 |